United States Patent
Chang et al.

(10) Patent No.: US 10,024,992 B2
(45) Date of Patent: Jul. 17, 2018

(54) STRUCTURAL ELEMENT FOR SONIC TOOLS AND ACOUSTIC ISOLATORS

(71) Applicant: Halliburton Energy Services, Inc., Houston, TX (US)

(72) Inventors: Chung Chang, Houston, TX (US); Muralidhar Seshadri, Sugar Land, TX (US); Jean G. Saint Germain, Humble, TX (US); Paul Junghans, Houston, TX (US); Gary Kainer, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/907,958

(22) PCT Filed: Aug. 6, 2015

(86) PCT No.: PCT/US2015/044052
§ 371 (c)(1),
(2) Date: Jan. 27, 2016

(87) PCT Pub. No.: WO2016/022826
PCT Pub. Date: Feb. 11, 2016

(65) Prior Publication Data
US 2016/0252639 A1 Sep. 1, 2016

Related U.S. Application Data

(60) Provisional application No. 62/035,118, filed on Aug. 8, 2014.

(51) Int. Cl.
*G01V 1/52* (2006.01)
*G01V 1/46* (2006.01)
(Continued)

(52) U.S. Cl.
CPC ............ *G01V 1/46* (2013.01); *G01V 1/02* (2013.01); *G01V 1/16* (2013.01); *G01V 1/523* (2013.01)

(58) Field of Classification Search
CPC . G01V 1/02; G01V 1/523; G01V 1/46; G01V 1/16
(Continued)

(56) References Cited

U.S. PATENT DOCUMENTS 3,191,143 A 6/1965 Pardue
3,381,267 A 4/1968 Cubberly, Jr.
(Continued)

FOREIGN PATENT DOCUMENTS

EP 0916100 B1 10/2007

OTHER PUBLICATIONS

International Search Report and the Written Opinion of the International Searching Authority, or the Declaration, dated Oct. 26, 2015, PCT/US2015/044052, 17 pages, ISA/KR.
(Continued)

*Primary Examiner* — Daniel L Murphy
(74) *Attorney, Agent, or Firm* — Haynes & Boone, LLP

(57) ABSTRACT

An acoustic tool for evaluating a geologic formation includes a housing member disposed between transmitter and receiver sections of the acoustic tool. The housing member defines a change in direction in an acoustic path extending therethrough such that acoustic signals traveling through the housing member are delayed and disrupted. The delay and disruption may isolate the acoustic signals traveling through the housing member from acoustic signals traveling through the geologic formation. Thus, the acoustic tool may facilitate identification and evaluation of acoustic signals traveling through the geologic formation.

19 Claims, 14 Drawing Sheets

(51) Int. Cl.
*G01V 1/02* (2006.01)
*G01V 1/16* (2006.01)

(58) Field of Classification Search
USPC .......................................................... 367/25
See application file for complete search history.

(56) References Cited

U.S. PATENT DOCUMENTS

| | | | | |
|---|---|---|---|---|
| 4,665,511 | A | * | 5/1987 | Rodney ................ E21B 47/082 367/27 |
| 4,850,450 | A | | 7/1989 | Hoyle et al. |
| 4,872,526 | A | | 10/1989 | Wignall et al. |
| 6,082,484 | A | * | 7/2000 | Molz ....................... G01V 1/523 181/102 |
| 6,474,439 | B1 | | 11/2002 | Hoyle et al. |
| 6,739,423 | B2 | | 5/2004 | Tashiro et al. |
| 7,334,661 | B2 | | 2/2008 | Pabon et al. |
| 7,336,562 | B1 | | 2/2008 | Hoyle et al. |
| 7,832,457 | B2 | * | 11/2010 | Calnan .................... B22F 3/008 164/15 |
| 2005/0034858 | A1 | | 2/2005 | Redding et al. |
| 2007/0216415 | A1 | | 9/2007 | Clark et al. |
| 2011/0267061 | A1 | | 11/2011 | Taracila et al. |

OTHER PUBLICATIONS

European Extended Search Report, dated Oct. 19, 2017, EP 15829448.8, 8 pages, ISA/EP.

* cited by examiner

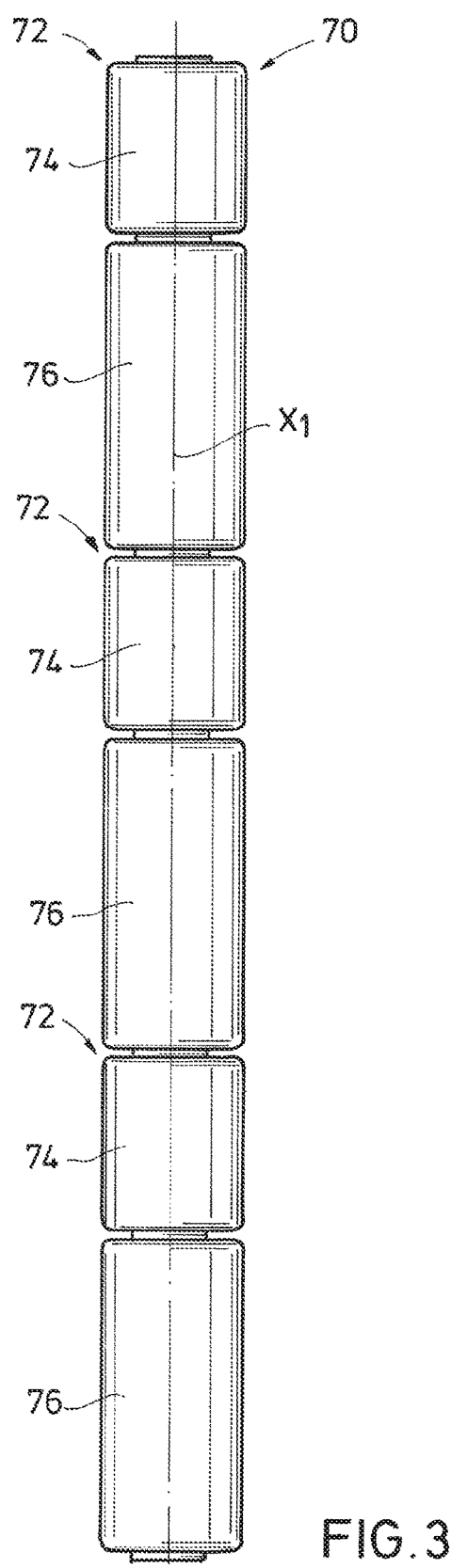
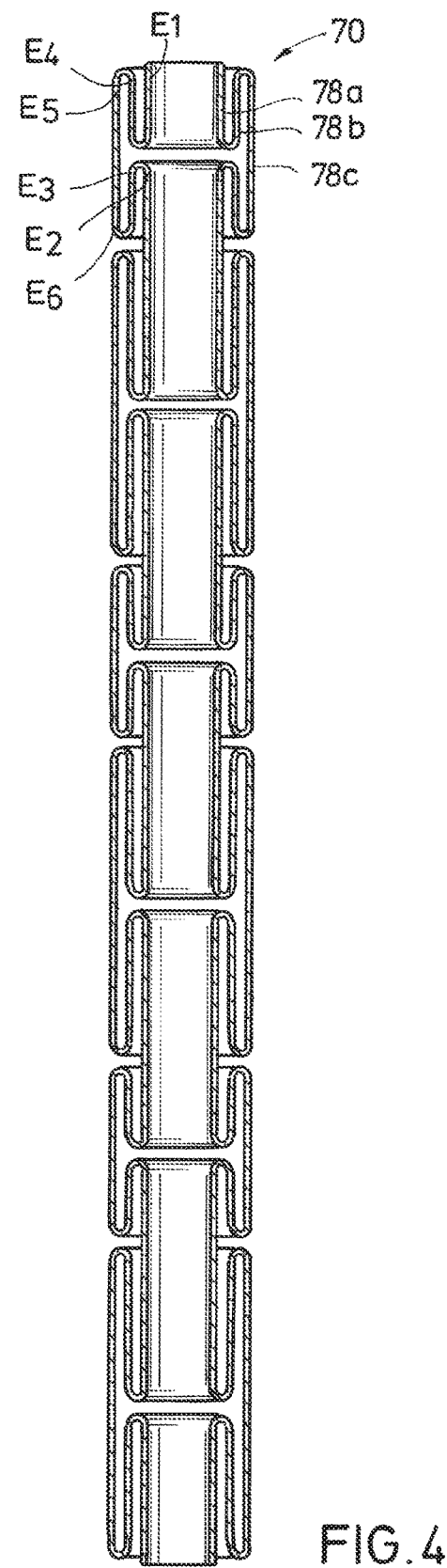

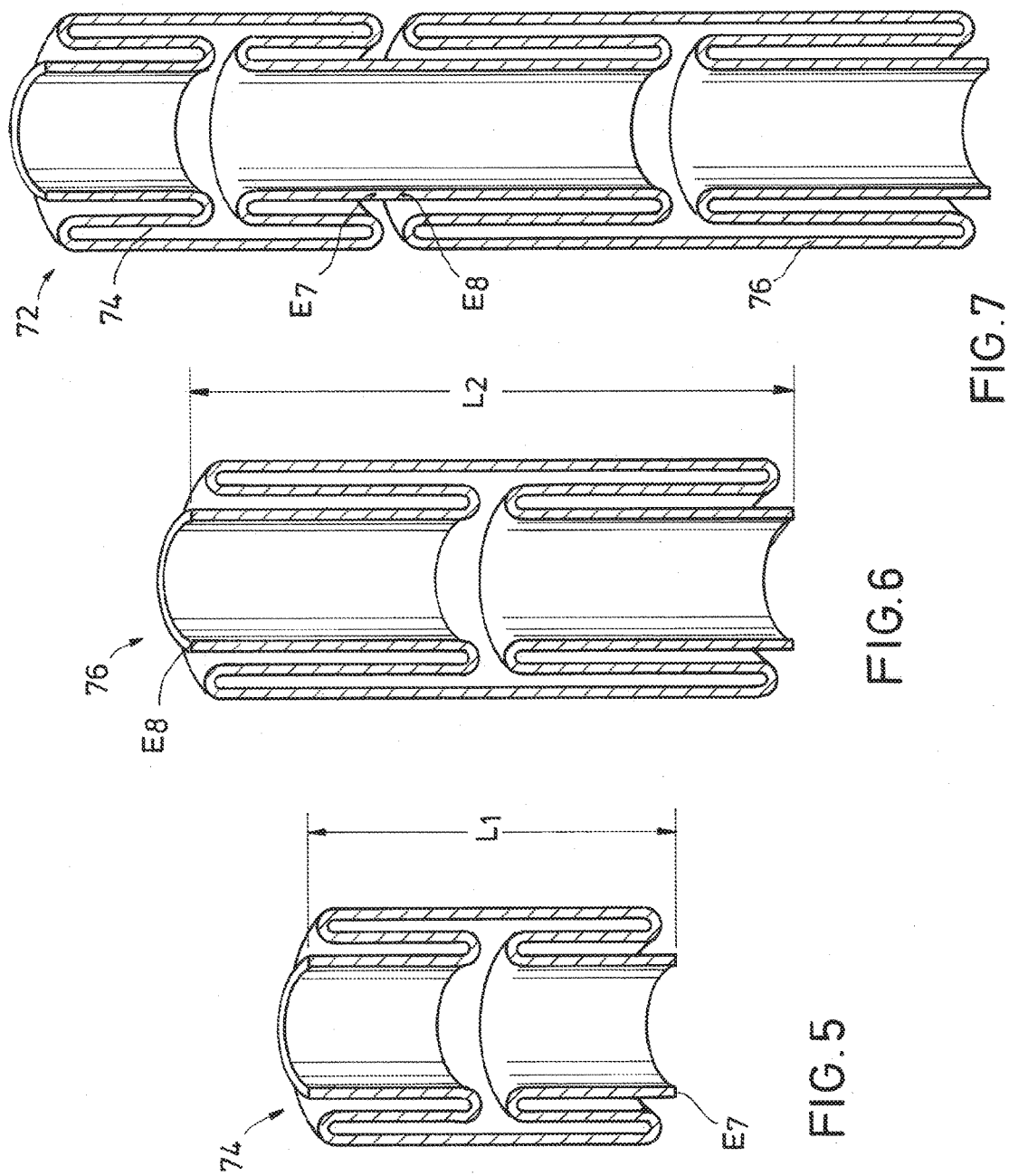

STRUCTURAL ELEMENT FOR SONIC TOOLS AND ACOUSTIC ISOLATORS

CROSS-REFERENCE TO RELATED APPLICATIONS

The present application is a U.S. National Stage patent application of International Patent Application No. PCT/US2015/044052, filed on Aug. 6, 2015, which claims priority to U.S. Provisional Application No. 62/035,118 filed Aug. 8, 2014, entitled "Structural Element for Wireline Sonic Tools and Acoustic Isolators" the disclosures of which hereby incorporated by reference in their entirety

BACKGROUND

1. Field of the Invention

The present disclosure relates generally to evaluating geologic formations, e.g., geologic formations surrounding a hydrocarbon recovery wellbore. More particularly, embodiments of the disclosure relate to acoustic logging tools including a housing member arranged to delay or impede the propagation of acoustic energy through the housing member.

2. Background

The use of acoustic measurement systems (e.g., audible and/or ultrasonic systems) in downhole applications, such as logging-while-drilling (LWD), measurement while drilling (MWD), and wireline logging applications, is well known. Such acoustic measurement systems are utilized in a variety of downhole applications including, for example, borehole caliper measurements, measurement of drilling fluid properties, and the determination of various physical properties of a geologic formation. In one application, acoustic waveforms may be generated at one or more transmitters deployed in the borehole. The acoustic responses may then be received at an array of longitudinally spaced apart receivers deployed in the borehole. Acoustic logging in this manner provides an important set of borehole data and is commonly used in both LWD and wireline applications to determine compressional and shear wave velocities (also referred to as slownesses) of the geologic formation.

Many acoustic logging tools include a housing member that separates a transmitter section of the tool from a receiver section of the tool. In operation, the transmitter section is actuated to emit acoustic energy into a wellbore, and the acoustic energy propagates to the receiver section along multiple paths. For example, a first acoustic signal can propagate through a geologic formation that is the subject of investigation, and a second acoustic signal can also propagate through the housing member. Since the second signal propagated through the housing member often interferes with the receipt and evaluation of the first signal propagated through the geologic formation, efforts have been made to distinguish and acoustically isolate the first and second signals.

BRIEF DESCRIPTION OF THE DRAWINGS

The disclosure is described in detail hereinafter on the basis of embodiments represented in the accompanying figures, in which:

FIG. 3 is a front view of the housing member of FIG. 1 or FIG. 2 in accordance with example embodiments of the present disclosure;

FIG. 4 is a cross-sectional perspective view of the housing member of FIG. 3 illustrating an indirect acoustic path defined between longitudinal ends of the housing member and extending along a plurality of lateral layers of the housing member;

FIGS. 5 and 6 are cross-sectional perspective views of two distinct 3-layer housing modules that have different longitudinal lengths and that can be assembled to one another in the construction of the housing member of FIG. 3;

FIG. 7 is a cross-sectional perspective view of a unit cell constructed of the housing modules of FIGS. 5 and 6, and which may be assembled with similar unit cells to defines a repeating structure in the housing member of FIG. 3;

DETAILED DESCRIPTION

Figure 1:
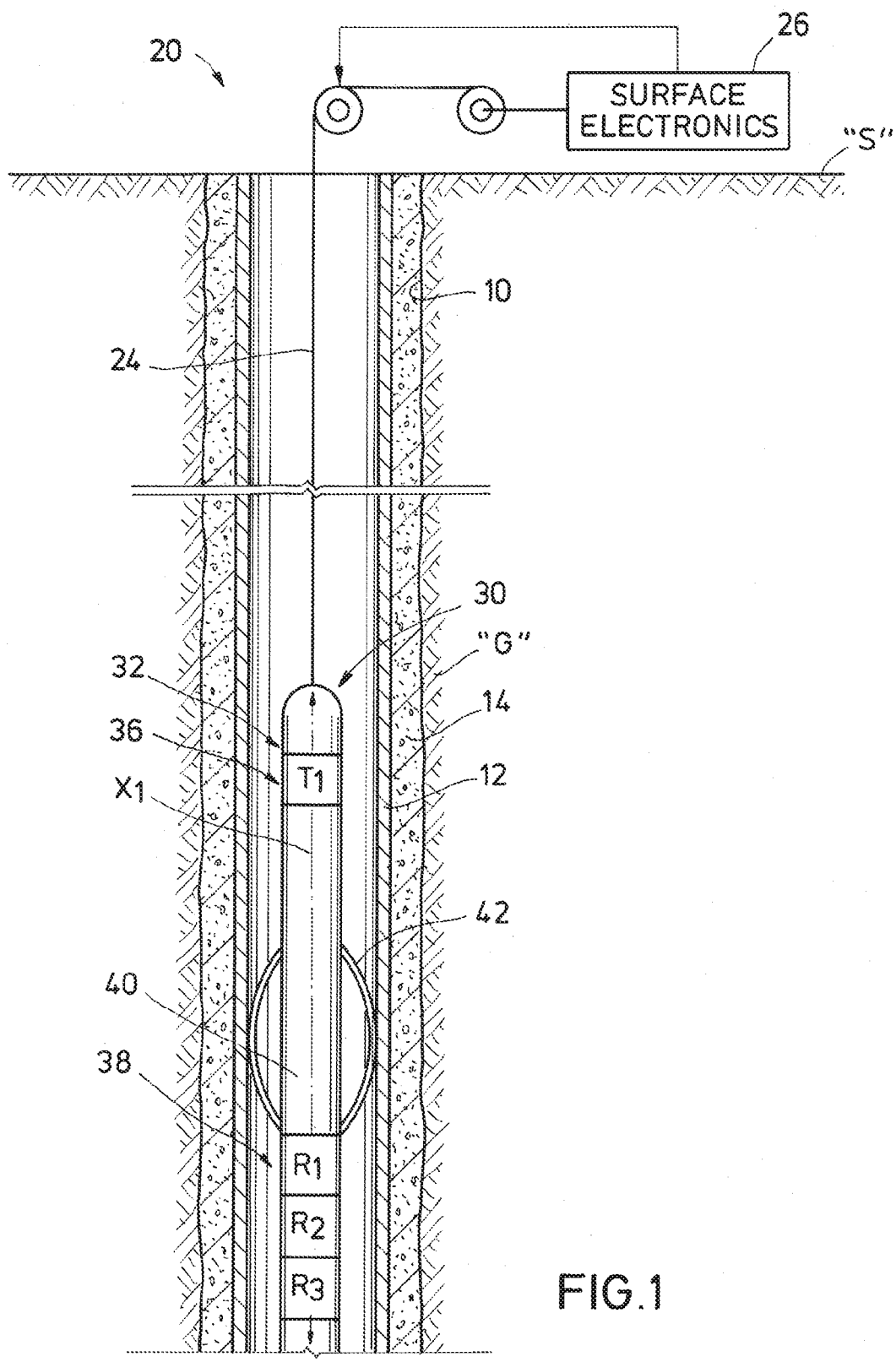
FIG. 1 is a partially cross-sectional schematic view of an acoustic logging tool disposed by wireline into a wellbore, the acoustic logging tool including a transmitter section, a receiver section and a housing member disposed therebetween in accordance with example embodiments of the present disclosure.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, up-hole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the up-hole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict an apparatus in a portion of a wellbore having a specific orientation, unless indicated otherwise, it should be understood by those skilled in the art that the apparatus according to the present disclosure may be equally well suited for use in wellbore portions having other orientations including vertical, slanted, horizontal, curved, etc. Likewise, unless otherwise noted, even though a Figure may depict an onshore or terrestrial operation, it should be understood by those skilled in the art that the apparatus according to the present disclosure is equally well suited for use in offshore operations. Further, unless otherwise noted, even though a Figure may depict a wellbore that is cased, it should be understood by those skilled in the art that the apparatus according to the present disclosure may be equally well suited for use in fully open-hole wellbores.

1. Description Of Exemplary Embodiments

Acoustic tools for evaluating a geologic formation are disclosed. The acoustic tools include housing members configured to delay and disrupt acoustic signals traveling therethrough to facilitate evaluation of acoustic signals traveling through the geologic formation. The housing members may include a plurality of laterally separated layers that define an alteration in direction in an acoustic path extending longitudinally through the housing members. Acoustic signals may be prevented from traveling through the lateral space between layers such that the signals are induced to travel sequentially through each of the laterally separated layers of the acoustic path. Thus, the flight time of the acoustic signals is increased in comparison to the flight time the acoustic signals would take if permitted travel along a direct longitudinal path through the housing members.

FIG. 1 illustrates a wellbore 10 that extends downward from a surface location "S" through a geologic formation "G." The wellbore 10 is illustrated as including a metal casing 12 which lines the wellbore 10, and is bonded to the geologic formation "G" with cement 14. Principles of the present disclosure can also be practiced in uncased or partially uncased wellbores (not shown) as well. At the surface location "S," a wireline suspension assembly 20 is illustrated from which a wire line 24 is disposed into the wellbore 10. Surface electronics 26 are provided for controlling the wireline suspension assembly 20 and can communicate with downhole tools and components using wired or wireless telemetry systems as recognized in the art.

A logging string 30 is formed where the lower end of the wireline 24 is affixed to a logging tool 32. The logging tool 32 can include or be part of systems such as the Hostile Full Wave Sonic (HFWS™) logging tool marketed by Halliburton. The logging tool 32 generally defines a longitudinal axis $X_1$, and includes a transmitter section 36, a receiver section 38 and a housing member 40 interconnected therebetween. Stabilizers 42 are optionally provided to center the logging tool 32 within the wellbore 10. The transmitter section 36 includes one or more transmitters $T_1$ that are operable to selectively emit acoustic waves or other signals therefrom into the wellbore 10. The receiver section 38 includes a plurality of longitudinally spaced receivers $R_1$, $R_2$, $R_3$ that can detect the acoustic waves that travel through the geologic formation "G" from the transmitter section 36. As described in greater detail below, the housing member 40 is configured to permit the receiver section 38 to receive and/or record the acoustic waves traveling through the geologic formation "G," while avoiding interference from the acoustic waves arriving at the receivers $R_1$, $R_2$, $R_3$ through the housing member 40. In some example embodiments, the acoustic waves may not necessarily be recorded down hole. The acoustic waves, or data representative of the acoustic waves, may be communicated to surface equipment (not shown) disposed at the surface location "S" (FIG. 1).

In particular, the housing member 40 is configured to disrupt the direct longitudinal travel of the acoustic waves through the housing member 40, and forces the acoustic waves to take a zigzag or tortuous path through the housing member 40 toward the array of receivers $R_1$, $R_2$, $R_3$. This, in turn, causes an increase in the flight time of the acoustic waves and/or a delay in the arrival of the acoustic waves at receivers $R_1$, $R_2$, $R_3$ as compared to a traditional housing (not shown) that defines a straight acoustic path between the transmitter and receiver sections 36, 38, as would be defined by a solid straight sleeve (not shown). The performance of traditional acoustic tool sleeves can be inadequate in some instances, particularly when the geologic formation "G" compressional speed is slower than about 175 μsec/ft. The housing member 40 is configured to allow for a longer window of quiet time, e.g., time that is free of tool wave interferences (interference from acoustic waves traveling through the housing 40 rather than the geologic formation "G") at the receivers R1, R2, R3, and therefore enables the measurement of a lower range of compressional speeds of the geologic formation "G."

Figure 2:
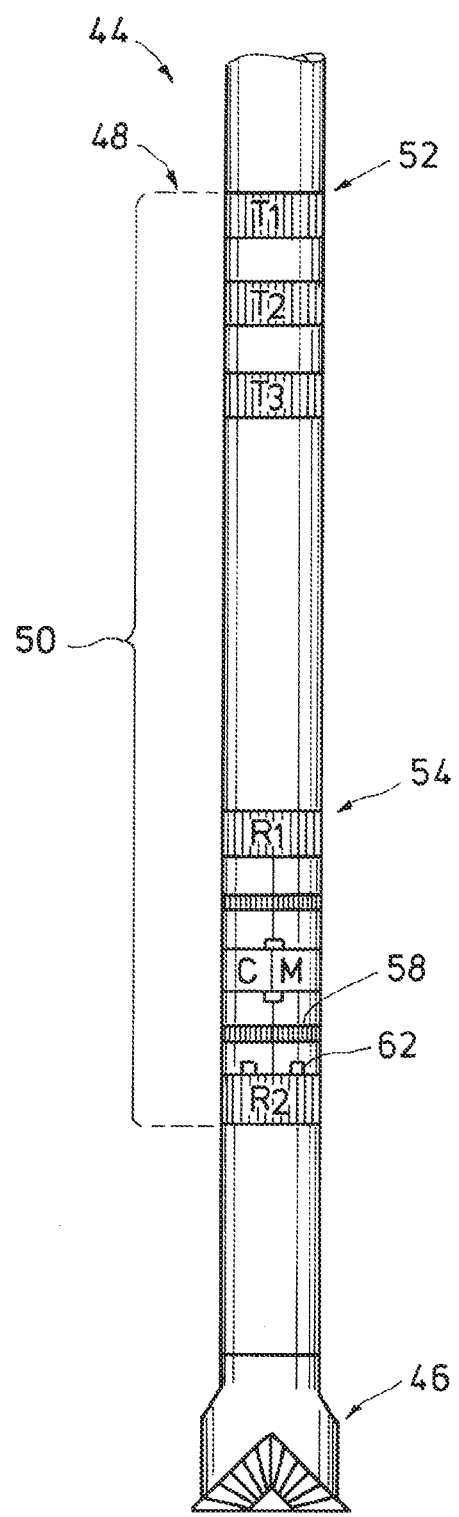
FIG. 2 is a schematic view of an acoustic logging tool including a housing member disposed within a drill string in accordance with other example embodiments of the present disclosure.

FIG. 2 illustrates a tool string 44 such as drill string 44 having a drill bit 46 at a lower end thereof in accordance with another aspect of the present disclosure. An LWD acoustic tool 48 is interconnected within the tool string 44 and includes housing member 50 interconnected between a transmitter section 52 and a receiver section 54. The transmitter section 52 includes a plurality of transmitters $T_1$, $T_2$, $T_3$, and receiver section 54 includes a pair of longitudinally spaced receivers $R_1$ and $R_2$. In other embodiments, any number of transmitters and/or receivers may be provided in a transmitter or receiver section. The housing member 50 is also configured to delay and disrupt the transmittal of acoustic waves therethrough (as described in greater detail below) between the transmitter section 52 and the receiver section 54. The receivers $R_1$ and $R_2$ may be operably coupled to an LWD memory module "M" and/or a communication device "C" carried by the receiver section 54 or another portion of the acoustic tool 48. The memory module "M" may include FLASH memory, computer-readable harddrives and/or any other suitable type of memory for collecting data from the receivers $R_1$ and $R_2$. The communication device "C" of may include a wired drill pipe, electromagnetic transceivers, one or more pulsers in a mud pulse telemetry system, or other mechanisms for transmitting data to the surface location "S" (FIG. 1). Thus, it should be appreciated that aspects of the present disclosure can be practiced in a logging-while-drilling context as well.

FIG. 2 also illustrates example embodiments where an acoustic tool 48 can include a housing member 50 formed integrally with the transmitter section 52, the receiver section 54, or both. The housing member 50 can include pockets defined therein, or mounts defined along the structure of the housing member that support the transmitters $T_1$, $T_2$, $T_3$ and/or the receivers $R_1$, $R_2$ on the housing member. Pockets 58 and mounts 62 are defined in the housing member 50 to couple the transmitters $T_1$, $T_2$, $T_3$ and the receivers $R_1$, $R_2$ to the housing member 50. The pockets 58 and/or mounts 62 can be defined or provided on any of the housing members, unit cells or housing modules described herein (see, e.g., FIG. 19).

Referring to FIGS. 3 through 7, example embodiments of the disclosure are illustrated including a housing member 70 (FIGS. 3 and 4). The housing member 70 may be constructed of a plurality of repeating unit cells 72 (FIG. 7), which are constructed of two distinct housing modules 74 (FIG. 5) and 76 (FIG. 6) in accordance with aspects of the present disclosure. The housing member 70 includes a cylindrical structure to be used as a structural element in a sonic or acoustic tool 32 (FIG. 1), 48 (FIG. 2). In some embodiments, the cylindrical structure includes at least two or more lateral layers 78a, 78b disposed at least partially adjacent one another, while in other embodiments, the cylindrical structure includes at least three or more lateral layers 78a, 78b, 78c disposed at least partially adjacent one another. A "layer" as referred to herein means at least a wall. In some embodiments, the wall may form an annular sleeve. Thus, lateral layers 78a, 78b, 78c may be one or more walls positioned at least partially adjacent one another or one or more sleeves of different diameters at least partially nested inside of one another, or a combination of sleeves and walls. In any event, each layer has two longitudinal ends, e.g., layer 78a includes longitudinal ends $E_1$, $E_2$, layer 78b includes longitudinal ends $E_3$, $E_4$ and layer 78c includes longitudinal ends $E_5$, $E_6$. A longitudinal end, e.g., $E_2$ of one layer 78a is coupled to a longitudinal end $E_3$ of an adjacent layer 78b to form a transmission guide or acoustic path for a wave or other acoustic signal from one layer 78a to the adjacent layer 78b (wall or sleeve, as the case may be). In one or more embodiments, (see, e.g., FIG. 13) a first plurality of layers 122 are longitudinally arranged about the longitudinal axis $X_1$ of the housing member 70 and a second plurality of layers 124 are radially arranged along longitudinal axis $X_1$. An end $E_{19}$ of one of the longitudinal layers 82 is coupled to an end $E_{20}$ of one of the radial layers 84 to join the longitudinal and radial layers 82, 84.

In any event, referring again to FIGS. 3 through 7, these layered and coupled structural elements or housing members 70, achieve a substantial added delay in the arrival time of the tool wave traveling through the housing member 70 or other acoustic signals as well as a significant reduction in the associated wave amplitude, by altering the direction of the acoustic path at least once, and preferably a multiplicity of times as the acoustic signal travels through the housing member 70. Although the alteration in direction of the acoustic path is not limited to a particular directional change, as a non-limiting example, two layers 78a, 78b that are parallel to one another and coupled each to the other at respective ends $E_2$, $E_3$ alter the direction of the acoustic path by reversing the direction. For example, an acoustic signal traveling downward through layer 78a may reverse direction and travel upward through layer 78b. The layered structures or housing members 70 achieve this by a combination of reflection, scattering, damping, and lengthening the acoustic path of the tool wave.

The structural element or housing member 70 is comprised of a plurality of unit cells 72 (three (3) unit cells 72 are illustrated in this example) that repeat along the longitudinal tool axis $X_1$. The unit cell 72 may be formed by combining one or more distinct housing modules 74, 76 by coupling two longitudinal ends $E_7$ and $E_8$ of the housing modules 74, 76 to one another. As used herein, the term "housing member" generally refers to a complete structural element extending between a transmitter section 36 (FIG. 1), 52 (FIG. 2) and a receiver section 38 (FIG. 1), 54 (FIG. 2) of an acoustic tool 32 (FIG. 1), 48 (FIG. 2). The terms "unit cell" and "housing module" generally refer to the individual portions of a "housing member." In some instances, these terms can be used interchangeably since in some embodiments, any of the "housing modules" described herein can comprise a complete structural element extending between a transmitter section and a receiver section of an acoustic tool and any or many of the "housing members" and/or "unit cells" described herein can be constructed as a unitary or monolithic component. The housing modules 74, 76 illustrated in FIGS. 5 and 6 each define a different longitudinal length, $L_1$, $L_2$, and can be coupled to one another to form the unit cell 72 illustrated in FIG. 7.

Figure 8:
FIGS. 8 through 13 are schematic views illustrating different acoustic paths that can be established with housing modules in accordance with other example embodiments of the present disclosure.

Referring to FIGS. 8 through 13, schematic representations of various acoustic paths of housing member 40 (FIG. 1), 50 (FIG. 2), 70 (FIG. 3) can be defined between points A and B, which are longitudinally separated from one another. FIG. 8 illustrates a straight longitudinal acoustic path 88 along arrow $A_1$, which could be defined by a solid cylindrical housing member (not shown).

Figure 9:
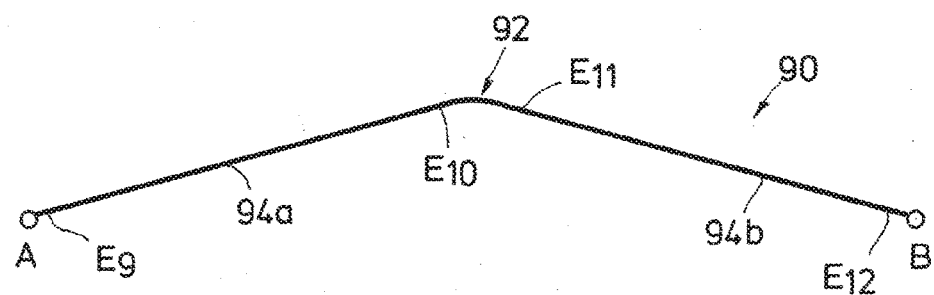

Referring to FIG. 9, an acoustic path 90 including an alteration of direction 92 is defined by first and second layers 94a, 94b. A first longitudinal end $E_9$ of the first layer 94a is disposed at point A, and a second longitudinal end $E_{10}$ of the first layer 94a is coupled to a first longitudinal end $E_{11}$ of the second layer 94b. A second longitudinal end $E_{12}$ of the second layer 94b is separated from the first layer 94a, and is disposed at point B. The alteration of direction 92 in the acoustic path is defined between the first and second layers 94a, 94b, and thus, the acoustic path 90 illustrated in FIG. 9 between points A and B is longer than the acoustic path 88 illustrated in FIG. 8 between points A and B.

Figure 10:
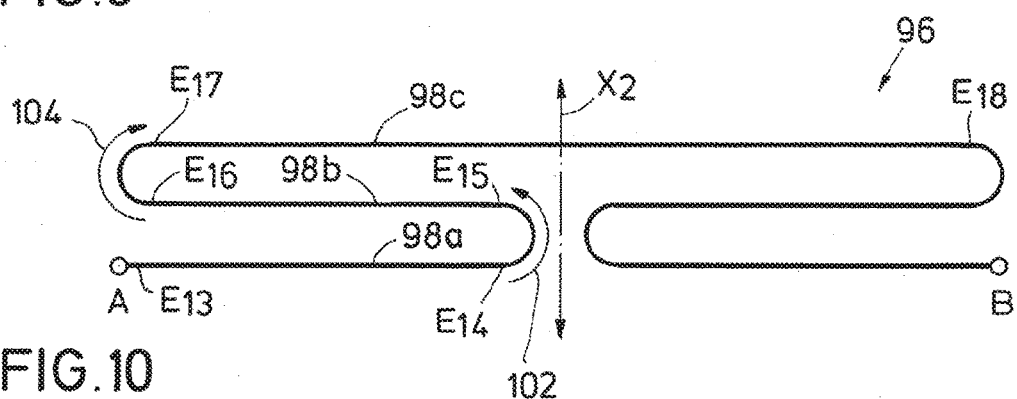

FIG. 10 illustrates an acoustic path 96 such as defined by the three-layer configuration of the housing modules 74, 76 of FIGS. 5 and 6. The acoustic path 96 extends from point A, which in some embodiments, can be at the transmitter section 52 (FIG. 2) of an acoustic tool 48 (FIG. 2). From point A, the acoustic path 96 extends along a first lateral layer 98a from a first end $E_{13}$ to a second end $E_{14}$ thereof. Between the first lateral layer 98a and a second lateral layer 98b, a reversal of direction 102 is defined in the acoustic path 96. The second lateral layer 98b is laterally offset from the first lateral layer 98a and has a first end $E_{15}$ coupled to the second end $E_{14}$ of the first lateral layer 98a. The second lateral layer 98b has a second end $E_{16}$ which is longitudinally closer to pint A than the first end $E_{15}$ of the second lateral layer 98b. At the second end $E_{16}$ of the second lateral layer 98b, another reversal of direction 104 is defined where the second end $E_{16}$ of the second lateral layer 98b is coupled to a first end $E_{17}$ of a third lateral 98c. The third lateral layer 98c extends to a second end $E_{18}$ thereof, which can be disposed in a laterally displaced position with respect to point B, but at a generally similar longitudinal location. A mirror axis $X_2$ is defined through the acoustic path 96 such that the first, second and third lateral layers 98a, 98b, 98c, which are mirrored such that the acoustic path 96 extends from the third lateral layer 98c to point B through additional layers 98d and 98e. Each of the individual lateral layers 98a, 98b, 98c, 98d, 98e illustrated in FIG. 10 is coupled an individual adjacent layer 98a, 98b, 98c, 98d, 98e only at one longitudinal end. For example, only the first end $E_{15}$ of the second lateral layer 98b is coupled to the first lateral layer 98a, and the second end $E_{16}$ of the second lateral layer 98b is separated from the first lateral layer 98a. Thus, the acoustic path 96 extends over an entire length of each of the layers 98a, 98b, 98c, 98d, 98e between points A and B.

Figure 11:
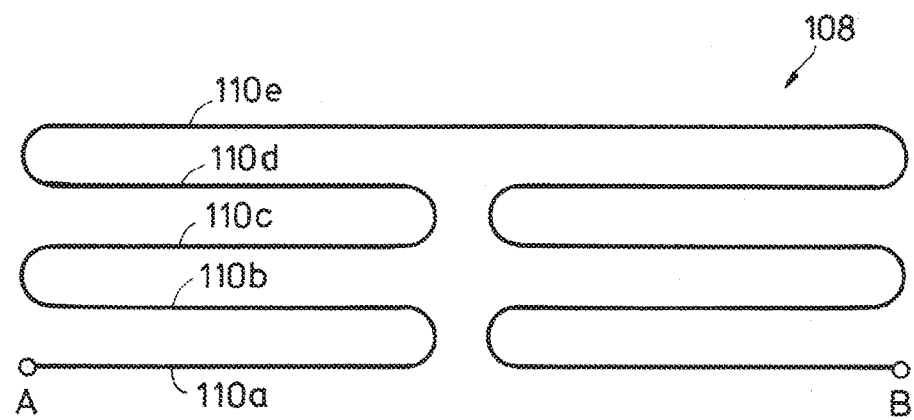
Figure 14:
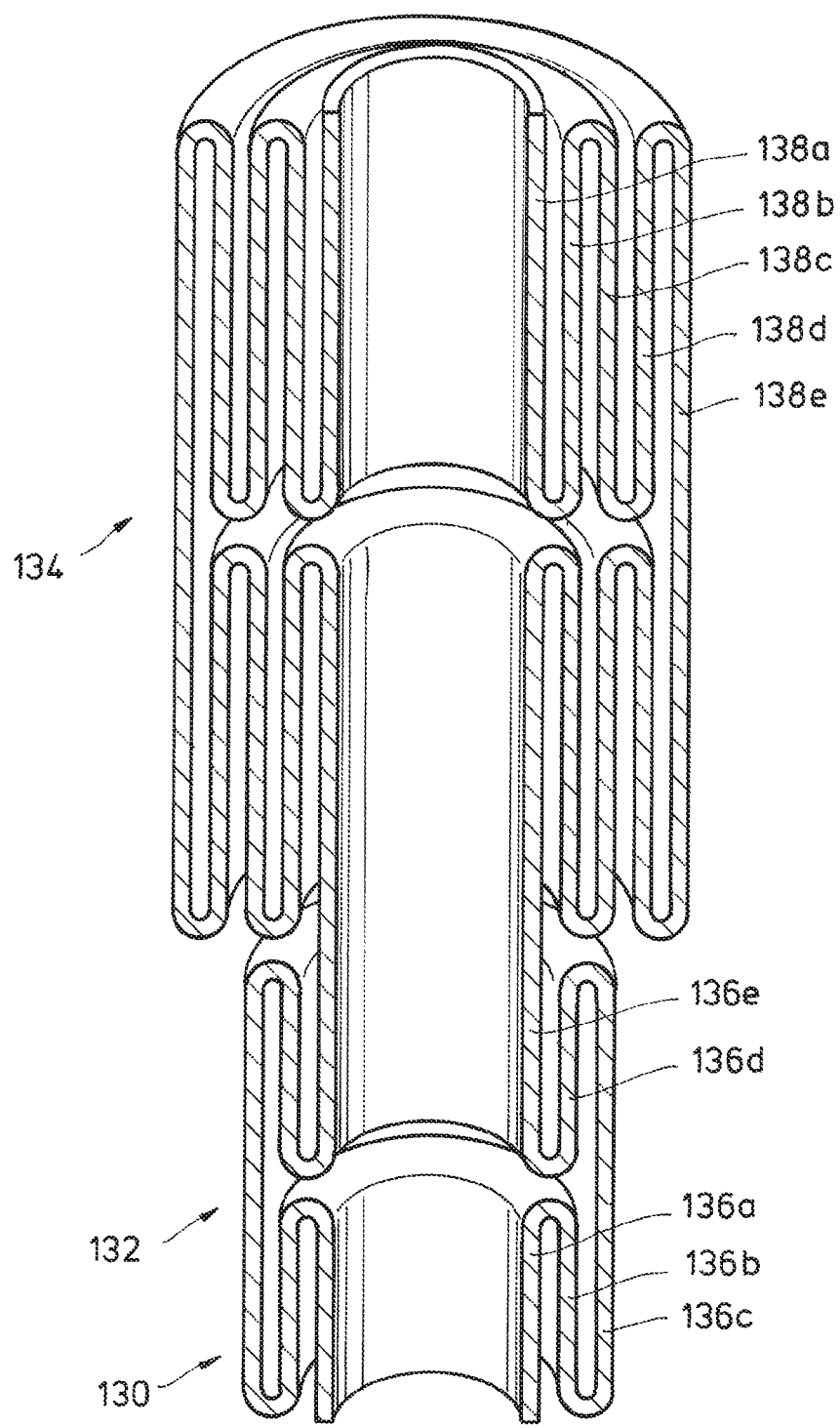
FIG. 14 is a cross-sectional perspective view of a unit cell including a 3-layer housing module and a 5-layer housing module illustrating a structural element with a different number of layers in the housing members therein in accordance with other example embodiments of the present disclosure.

FIG. 11 illustrates an acoustic path 108 such as defined by the five-layer configuration of the housing module (see, FIG. 14). The acoustic path 108 of FIG. 11 is similar to the acoustic path 96 of FIG. 10, but includes five laterally separated layers 110a, 110b, 110c, 110d, 110e instead of three. The total path length of between points A and B in the acoustic paths 96, 108 of FIGS. 10 and 11 is approximately 3 and 5 times, respectively, the total path length of the acoustic path 88 illustrated in FIG. 8. In general, housing members 40, 50, 70 (FIGS. 1, 2 and 4) including this multi-layered configuration can be used as structural elements with many layers of cylindrical tubes connected to each other to form a single continuous path for the acoustic wave from the transmitter section 36, 52 (FIGS. 1 and 2) to the receiver section 38, 54 (FIGS. 1, 2 and 4). This structural element creates a path for the acoustic waves that is much longer than the shortest spatial distance between the transmitter(s) $T_1$, $T_2$, $T_3$ and the receiver(s) $R_1$, $R_2$, $R_3$ in a wireline sonic tool 32 (FIG. 1), or in a measure while drilling acoustic tool 48 (FIG. 2).

Figure 12:
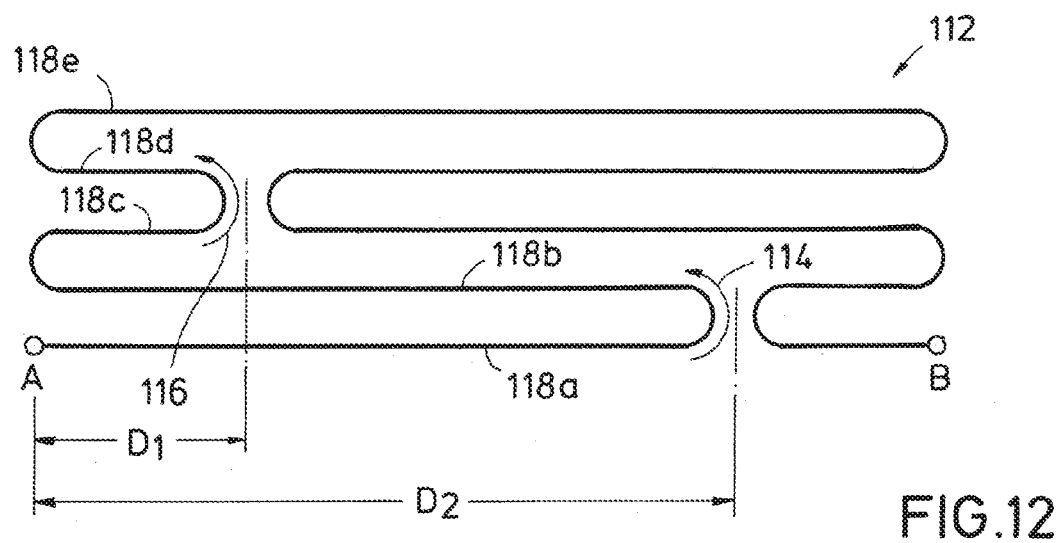

FIG. 12 illustrates an acoustic path 112 that includes reversals of direction 114, 116 that are defined at different longitudinal distances $D_1$ and D2 from point A. The various layers 118a, 118b, 118c, 118d, 118e of an acoustic path 112 defined by a multi-layered housing member can each extend different longitudinal distances $D_1$, $D_2$, and are not necessarily mirrored about a mirror axis $X_2$ (FIG. 10).

Figure 13:
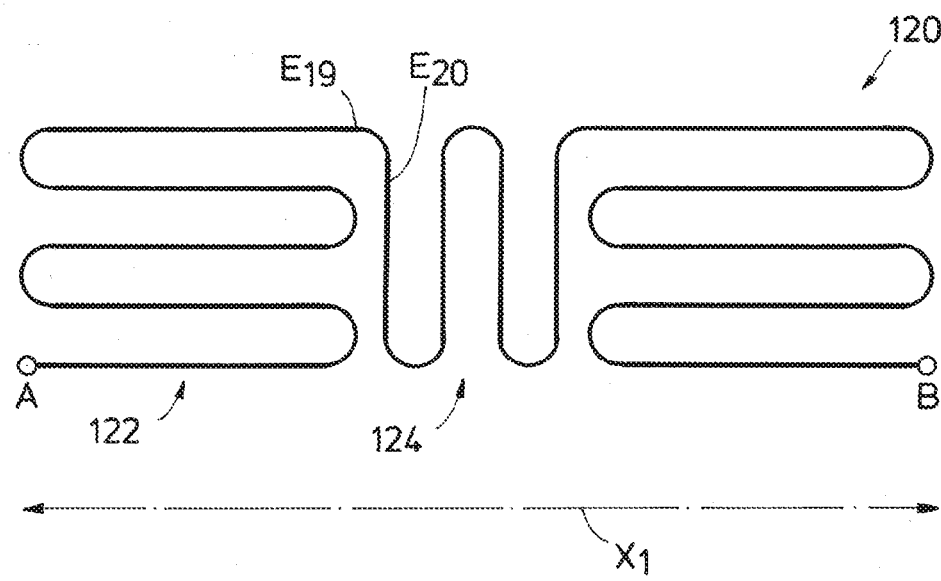

FIG. 13 illustrates an acoustic path 120 extending through a first plurality of layers 122 that are longitudinally arranged about an axis, e.g. axis $X_1$, and a second plurality of layers 124 that are radially arranged about axis $X_1$. An end $E_{19}$ of one of the longitudinal layers 122 is coupled to an end $E_{20}$ of one of the radial layers 124 to join the radial and longitudinal layers 122, 124.

Referring to FIG. 14, a unit cell 130 is constructed of two housing modules 132, 134 having a different number of layers from one other. The housing module 132 includes three-laterally spaced layers 136a, 136b and 136c. Although housing module 132 may include additional layers 136d and 136e, the housing module 132 may be described herein as a three-layer housing module 132 since there are no more than three lateral layers at any longitudinal location. For example, the three laterally spaced layers 136a, 136b and 136c extend across some longitudinal positions and three laterally spaced layers 136c, 136d and 136e extend across other longitudinal positions. The other housing module 134 includes five lateral layers 138a, 138b, 138c, 138d and 138e.

Generally, in other embodiments, a unit cell can be formed by combining any number of different or distinct housing modules, e.g., housing modules differing in a longitudinal length (see FIG. 7), a material of construction, a number of lateral layers (see FIG. 14), a thickness of the lateral layers (see FIGS. 15 and 16 described below), and/or a shape or curvature of the lateral layers (see FIGS. 17 and 18 described below).

Figure 16:
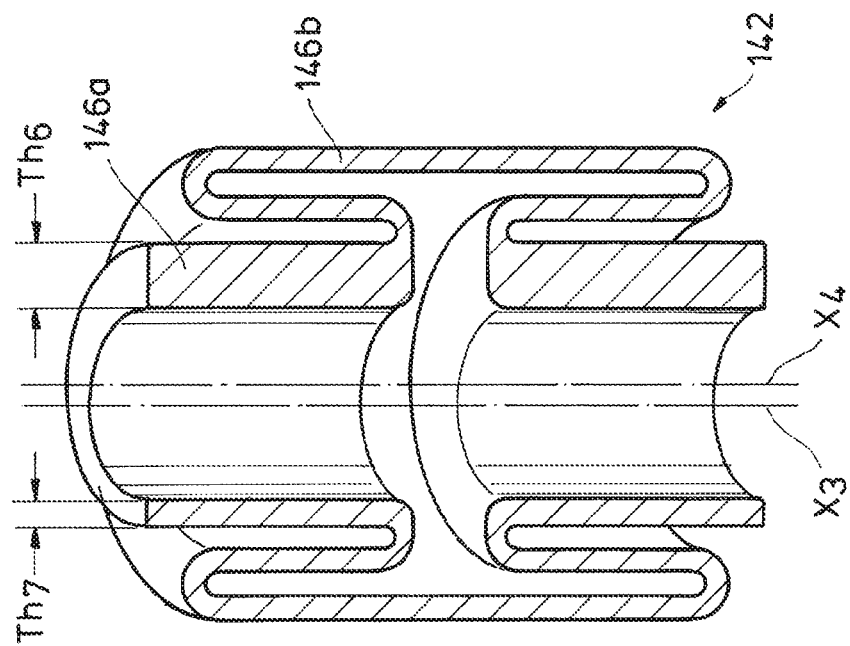
FIGS. 15 and 16 are cross-sectional perspective views of housing modules illustrating non-symmetrical layers having non-uniform thickness in accordance with other example embodiments of the present disclosure.
Figure 15:
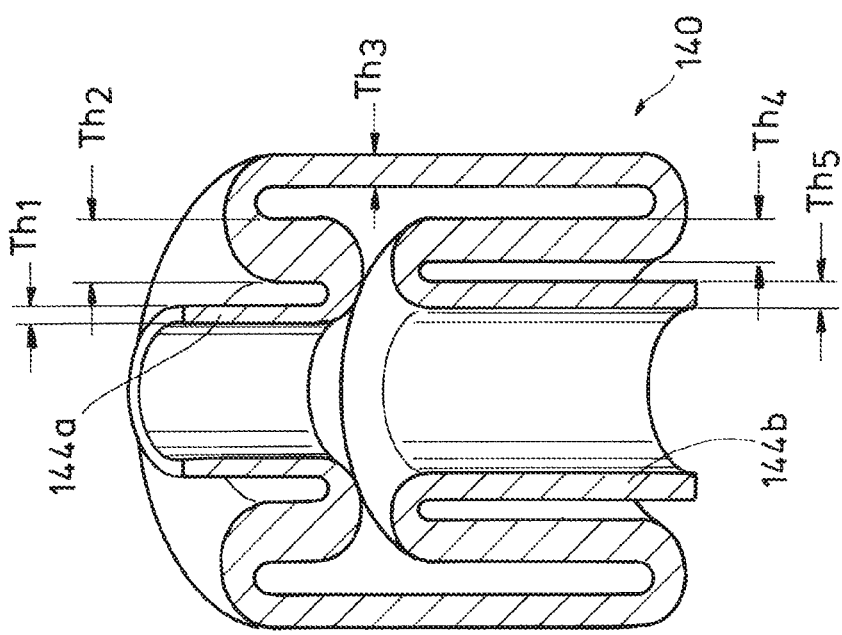

Referring to FIGS. 15 and 16, the different layers of housing modules 140, 142 can have different thicknesses, e.g., $Th_1$, $Th_2$, $Th_3$, $Th_4$, and $Th_5$ (FIG. 15) and/or may not necessarily be coaxial (see FIG. 16). The housing modules 140, 142 do not necessarily have any symmetry in the longitudinal direction. For example the thickness $Th_1$ of a first inner-most layer 144a may be different than the thickness $Th_5$ of a second inner-most layer 144b that is longitudinally spaced from the first inner-most layer 144a. Additionally, the thickness of a layer may change within the layer circumferentially such that a thickness $Th_6$ on one lateral side of layer 146a is different than the thickness $Th_7$ on another lateral side of the same layer 146a. In other embodiments (not shown), the thickness of an individual layer may change longitudinally such that a first longitudinal end of the layer is thicker or thinner than a second longitudinal end of the layer. Figure also 16 illustrates that lateral layers may not be co-axial. For example, the inner layer 146a may be disposed about a first longitudinal axis $X_3$ of the housing module 142, and an outer layer 144b may be disposed about a second longitudinal axis $X_4$ that is laterally offset from the first longitudinal axis $X_3$.

Figure 18:
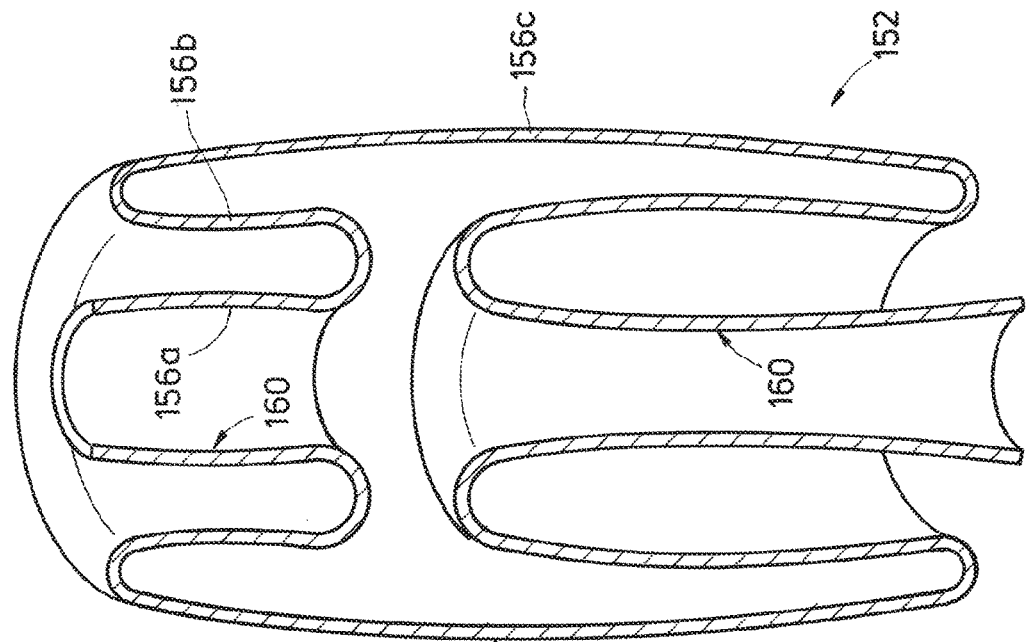
FIGS. 17 and 18 are cross-sectional perspective views of housing modules having curved walls in accordance with other example embodiments of the present disclosure.
Figure 17:
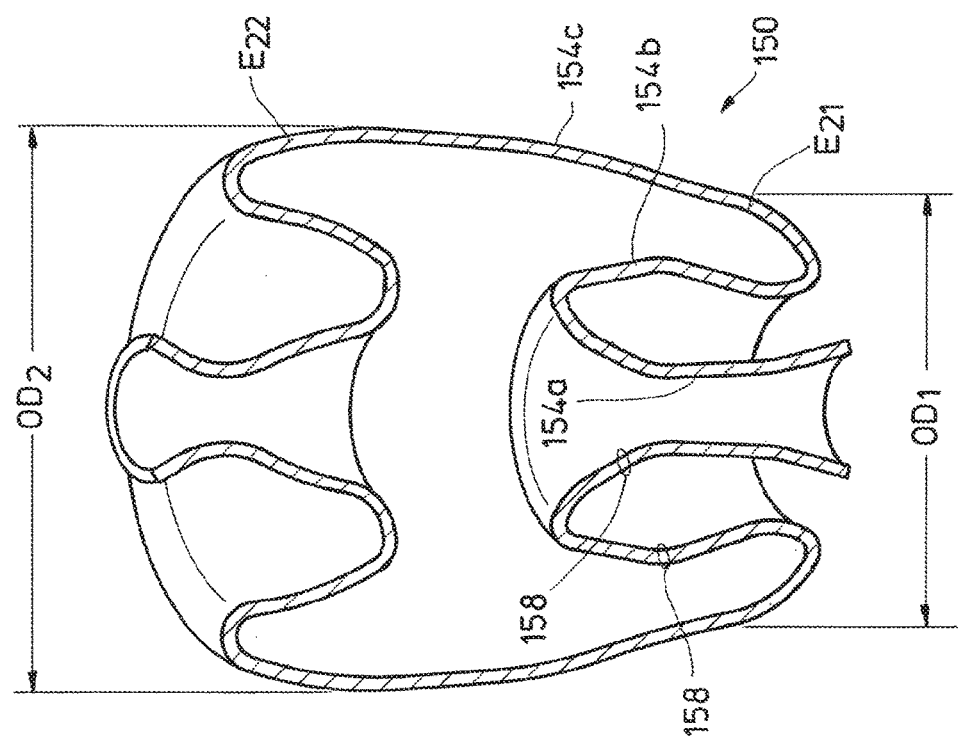

Referring to FIGS. 17 and 18, example housing modules 150, 152 are illustrated that include layers 154a, 154b, 154c, 156a, 156b, 156c that do not extend in a straight direction. Layers 154a, 154b, 154c, 156a, 156b, 156c of the housing modules 150, 152 illustrated in FIGS. 17 and 18 include bends 158 and curves 160 defined therein between reversals of direction 162, 164. The bends 158 in the housing module 150 illustrated FIG. 17 create an outer diameter $OD_1$ at a first longitudinal end $E_{21}$ of the housing module 150 that is smaller than an outer diameter $OD_2$ at a second longitudinal end $E_{22}$ of the housing module 150.

Figure 19:
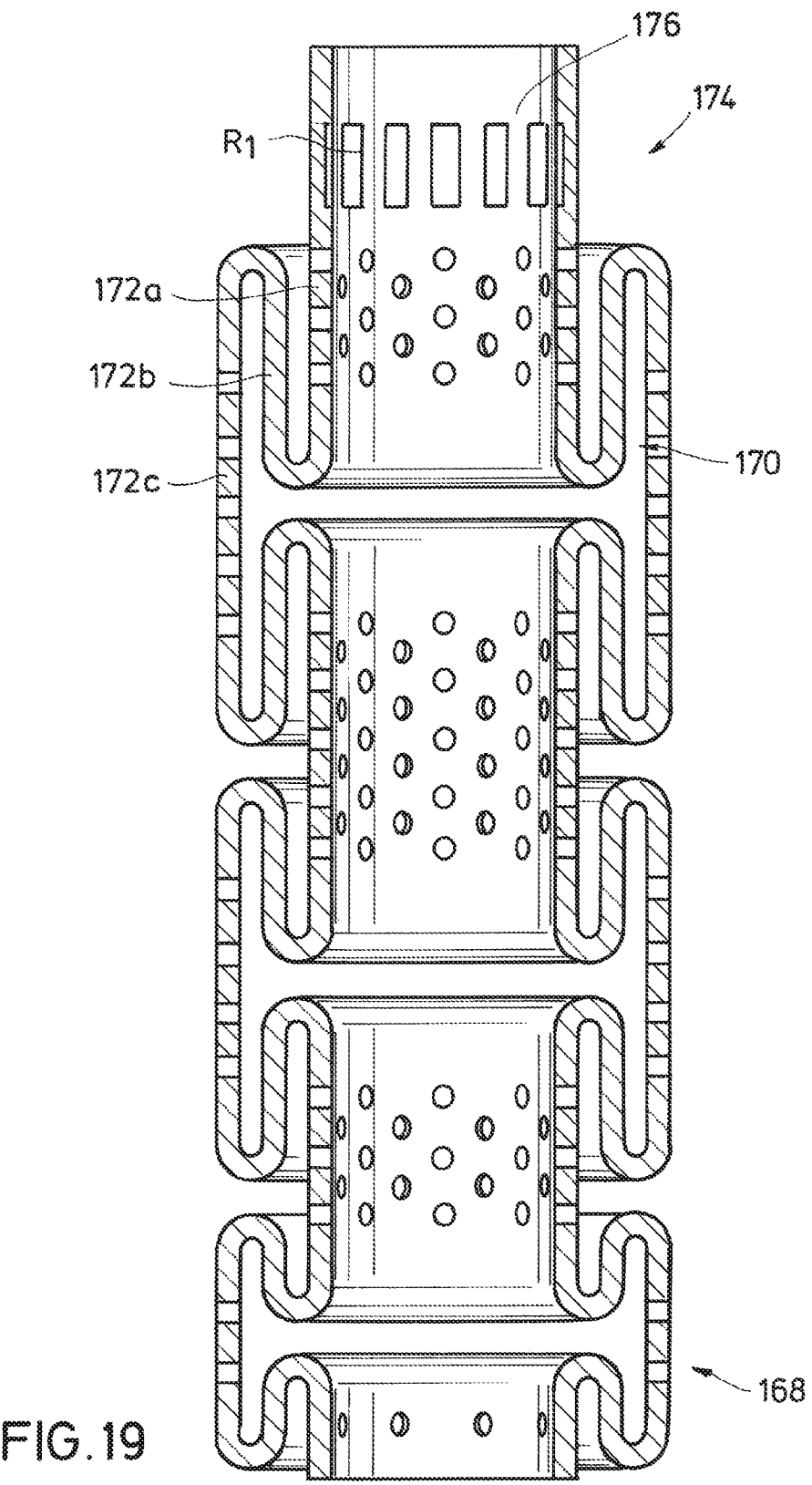
FIGS. 19 and 20 are cross-sectional perspective and front views, respectively, of a unit cell including perforations defined therein, the unit cell including a pocket defined therein in which a receiver section may be incorporated in accordance with other example embodiments of the present disclosure.
Figure 20:
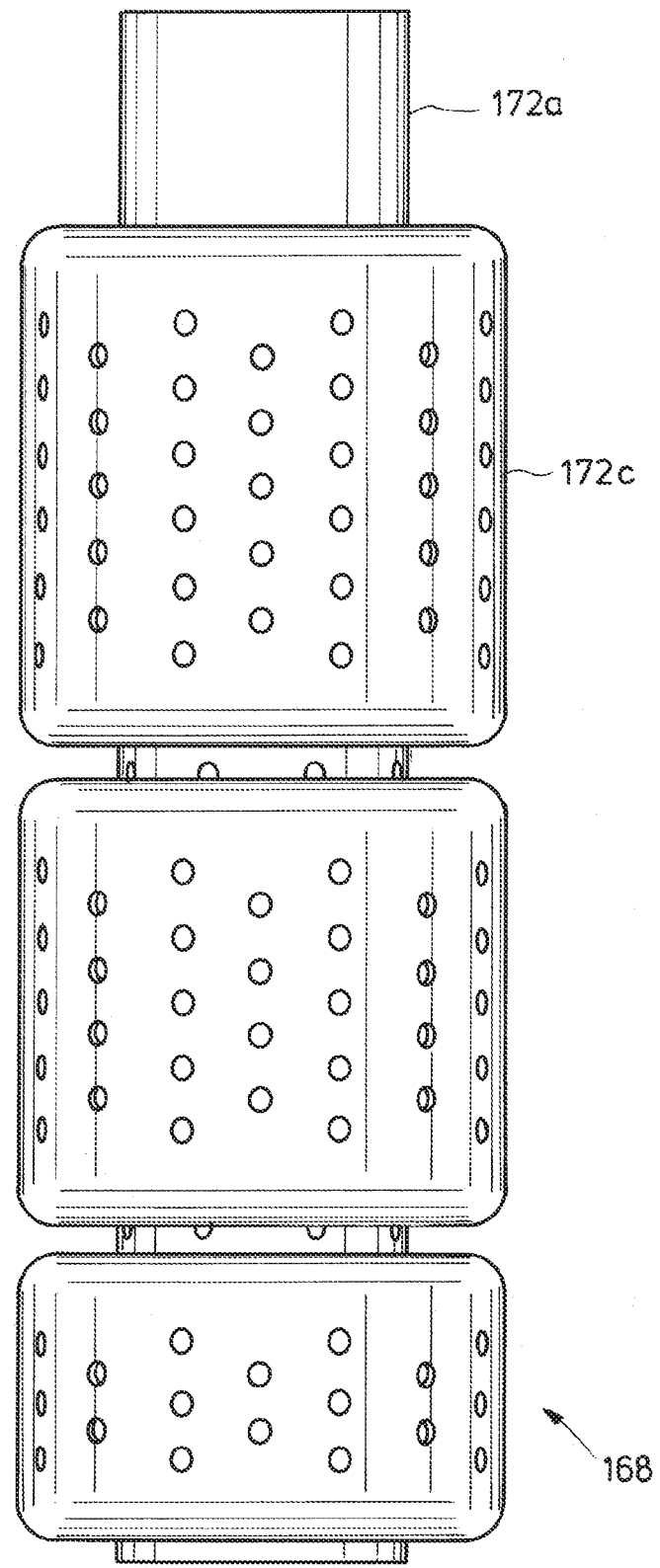

Referring to FIGS. 19 and 20, a unit cell 168 is illustrated that includes patterns of holes, slots or other discontinuities 170 defined in the layers 172a, 172b 172c. The slots, holes or discontinuities 170 can be circular, elongated and/or any general shape. The discontinuities 170 may be disposed on the unit cell 168 in regular or irregular patterns. The discontinuities 170 disrupt the direct travel path of a tool wave through each individual layer 172a, 172b 172c and force the tool wave to take a zigzag or tortuous path through the layer 172a, 172b 172c.

As illustrated in FIGS. 19 and 20, a receiver section 174 for an acoustic tool 32 (FIG. 1), 48 (FIG. 2) can be incorporated into the unit cell 168. A pocket 176 is formed in a longitudinal end $E_{23}$ of the unit cell 168 for receiving a receiver $R_1$. The pocket 176 is formed in the inner layer 172a that extends longitudinally beyond the outer layers 172b, 172c of the unit cell 168. In some example embodiments, the pocket 176 can be formed in on other locations of the unit cell 168 such as in one of the outer layers 172b, 172c, or at a location of the inner layer 172a that is longitudinally and radially disposed within the outer layers 172b, 172c of the unit cell 168. In some example embodiments (not shown), the holes, slots or other discontinuities 170 can support mounts 62 (FIG. 2) for a receiver $R_1$ and/or transmitter $T_1$ by bolts or other fasteners. In other embodiments, the pocket 176 and/or mounts 62 may support the receivers $R_1$ and/or transmitters $T_1$ on a structural member of the housing members 40, 50, 70 (FIGS. 1, 2 and 4) other than the unit cell 168 that includes the plurality of layers 172a, 172b 172c. For example, end caps (not shown) or other components may be provided at longitudinal ends of the unit cell 168 for mounting the receivers $R_1$ and/or transmitters $T_1$ therein.

Figures 21, 22:
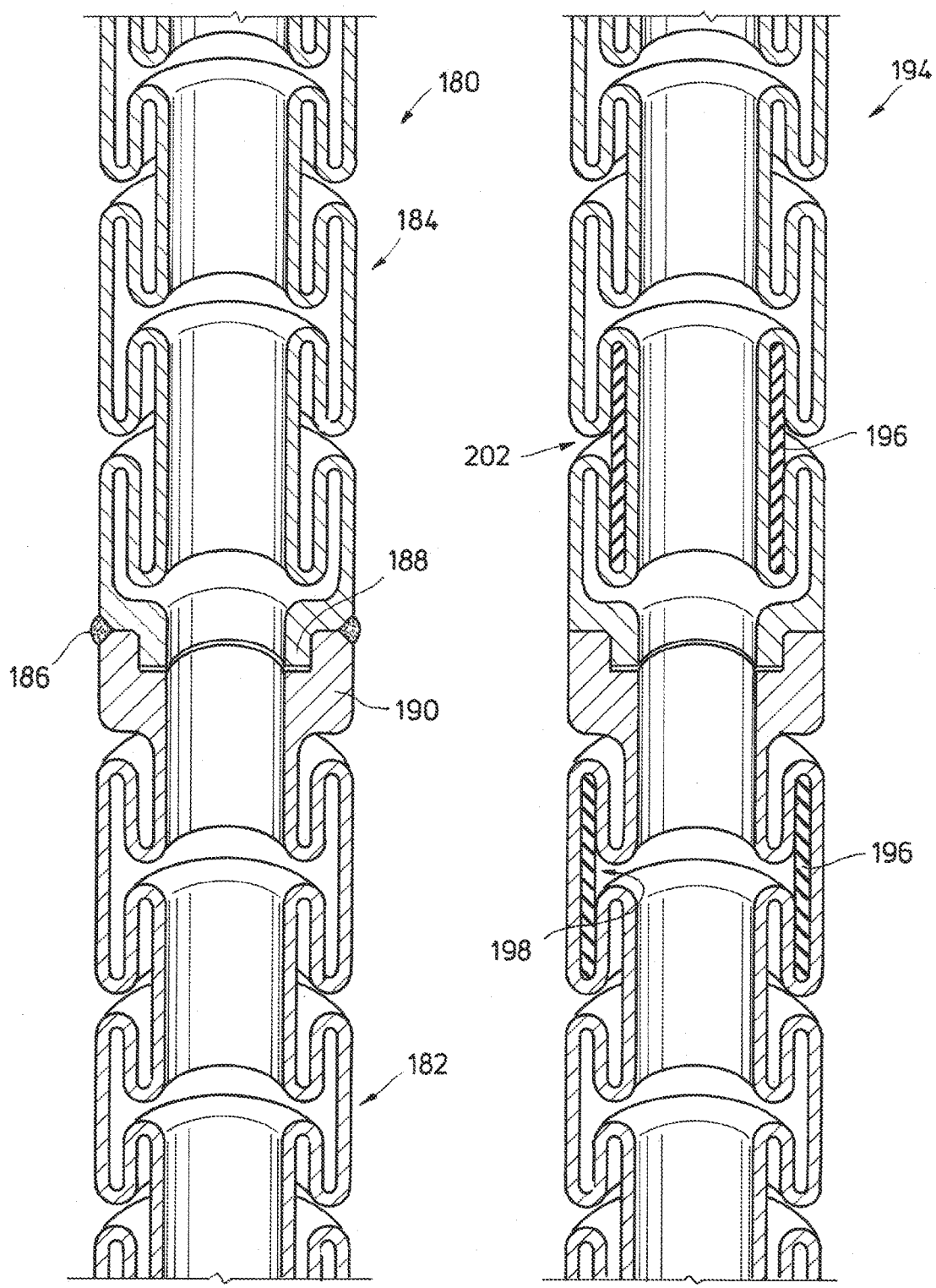
FIG. 21 is a cross-sectional perspective view of a unit cell constructed of two 3-layer housing modules and illustrating a connection established between the housing modules in accordance with another example embodiment of the present disclosure.
FIG. 22 is a cross-sectional perspective view of the unit cell of FIG. 21 and illustrating a damping material disposed within interior and exterior annular spaces defined laterally between the layers in accordance with other example embodiments of the present disclosure.

Referring to FIG. 21, a structural element 180, e.g., a unit cell or housing member, may be constructed by joining one or more smaller structural elements 182, 184 e.g., a housing module by methods such as welding, bolting, threading, etc. FIG. 21 illustrates examples where two smaller structural elements 182, 184 are welded together along an annular weld 186 to create the longer structural element 180. Although not depicted an overlapping pin 188 and box 190 arrangement could also include corresponding external and internal threads, respectively to facilitate coupling the structural elements 182, 184 to one another. In general, different structural elements 182, 184 coupled to one another can be constructed of different materials. The different materials can achieve a change in the speed of acoustic waves traveling through the structural element 180. The aforementioned joining methods and construction materials are not necessarily unique to the one or more embodiments shown in FIG. 21 and may be applied in other embodiments included herein.

Referring to FIG. 22, a structural element 194 may include a damping material 196 such as rubber, other polymers, epoxy etc. The damping material 196 can be introduced by injecting the damping material 196 to fill the lateral spaces 198, 202 between the different layers. The damping material 196 may fill lateral spaces 198 defined on an interior side of the structural element 194, or to fill lateral spaces 202 defined on an exterior side of the structural element 194. The injection of the damping material 196 can be uniformly or randomly applied along the entire structural element 194, or only in selected parts of the structural element 194. The particular damping material 196 may selected such that the damping material 196 serves to achieve damping of acoustic waves in selected ranges of frequency. Generally, the damping material 196 may exhibit greater acoustic damping properties than the structural element 194. Although not necessarily explicitly illustrated, the damping material 194 may be introduced in a similar manner into any of the structural elements described herein, e.g., structural elements, 40, 50, 70, 180, 182, 184, 194, 208, any structural element defining any of the acoustic paths illustrated in FIGS. 9 through 13, or any other structural element contemplated by the present disclosure.

Figure 23:
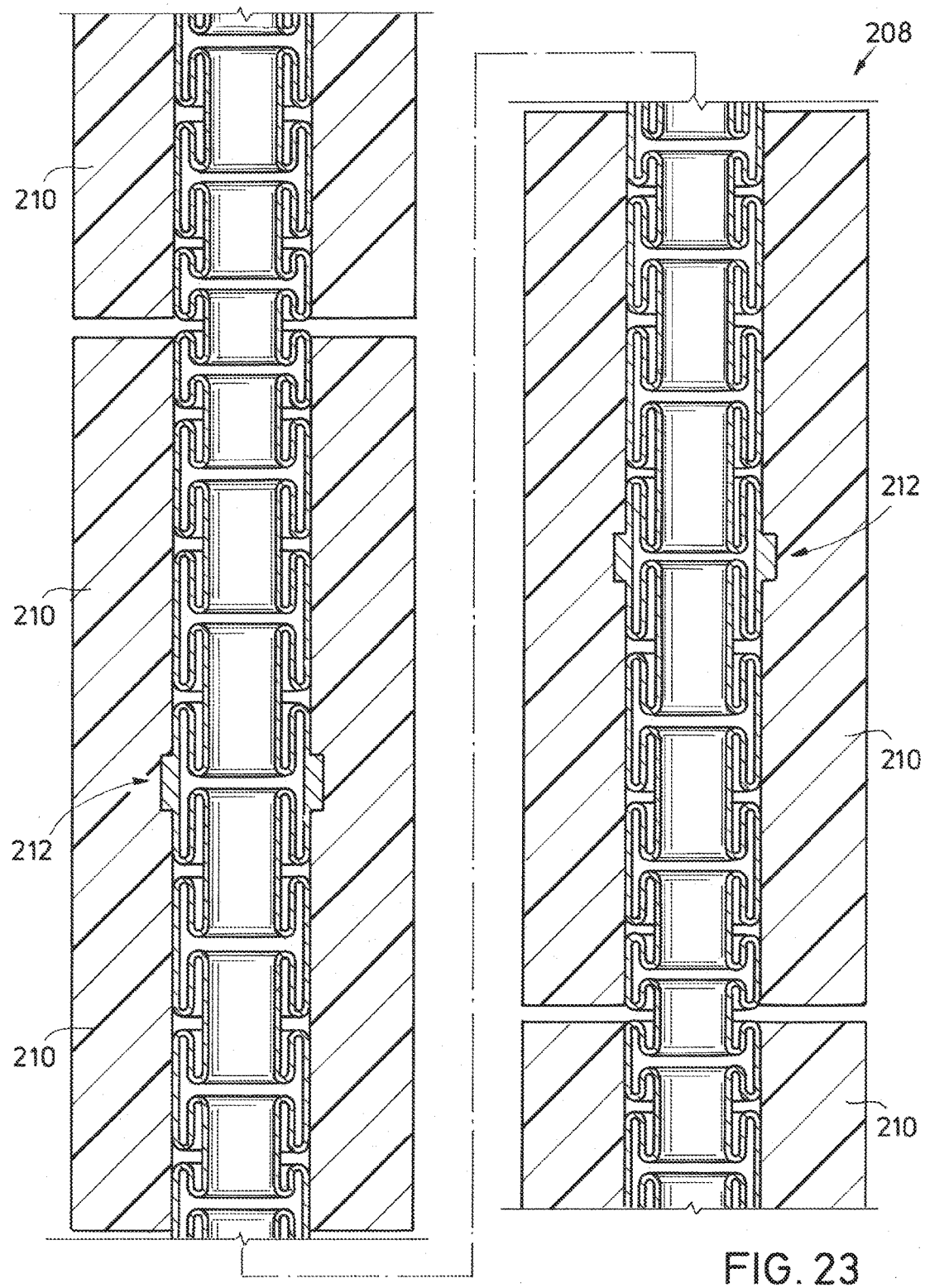
FIG. 23 is a cross-sectional perspective view of a housing member including a plurality of modulating masses affixed thereto, the housing member including housing modules interconnected therein which define augmented connection portions for connection of the modulating masses to the housing member.

Referring to FIG. 23, a structural element 208 may have a number of modulating masses 210 mounted thereon to modulate the natural frequencies of the structural element 208 as desired. The modulating masses 210 may be mounted to an exterior of the structural element 208 at regular or irregular intervals at mounting regions 212. The mounting regions 212 may include a wall with an increased thickness to accommodate the mounting of masses 210. In some example embodiments, the magnitude of the different masses 210 may be same or may differ from each other. Although not necessarily explicitly illustrated, the modulated masses 210 may be mounted to any of the structural elements described herein, e.g., structural elements, 40, 50, 70, 180, 182, 184, 194, 208, any structural element defining any of the acoustic paths illustrated in FIGS. 9 through 13, or any other structural element contemplated by the present disclosure.

In some embodiments, the multi-layer form of the housing members, unit cells and housing modules described herein can be constructed with 3-Dimensional printing techniques. Different materials can be employed in the 3-Dimensional printing of a single housing module or a single layer of a housing module. In some embodiments, the multi-layer form of the housing modules can be constructed from machining or bending techniques recognized in the art.

In some embodiments, a load limiting sleeve or other mechanism may be coupled within or around any of the housing members in any of the wellbore tools described herein. The load-limiting sleeve may include a plurality of longitudinally spaced segments that are coupled to one another to permit relative axial, torsional and or radial movement therebetween within a range of motion, and preclude relative motion therebetween if the range of motion is exceeded. When the relative motion is precluded, the load limiting sleeve may carry a greater portion of the various loads transmitted through the wellbore tool than, e.g., the housing members.

2. Exemplary Operational Procedure

Figure 24:
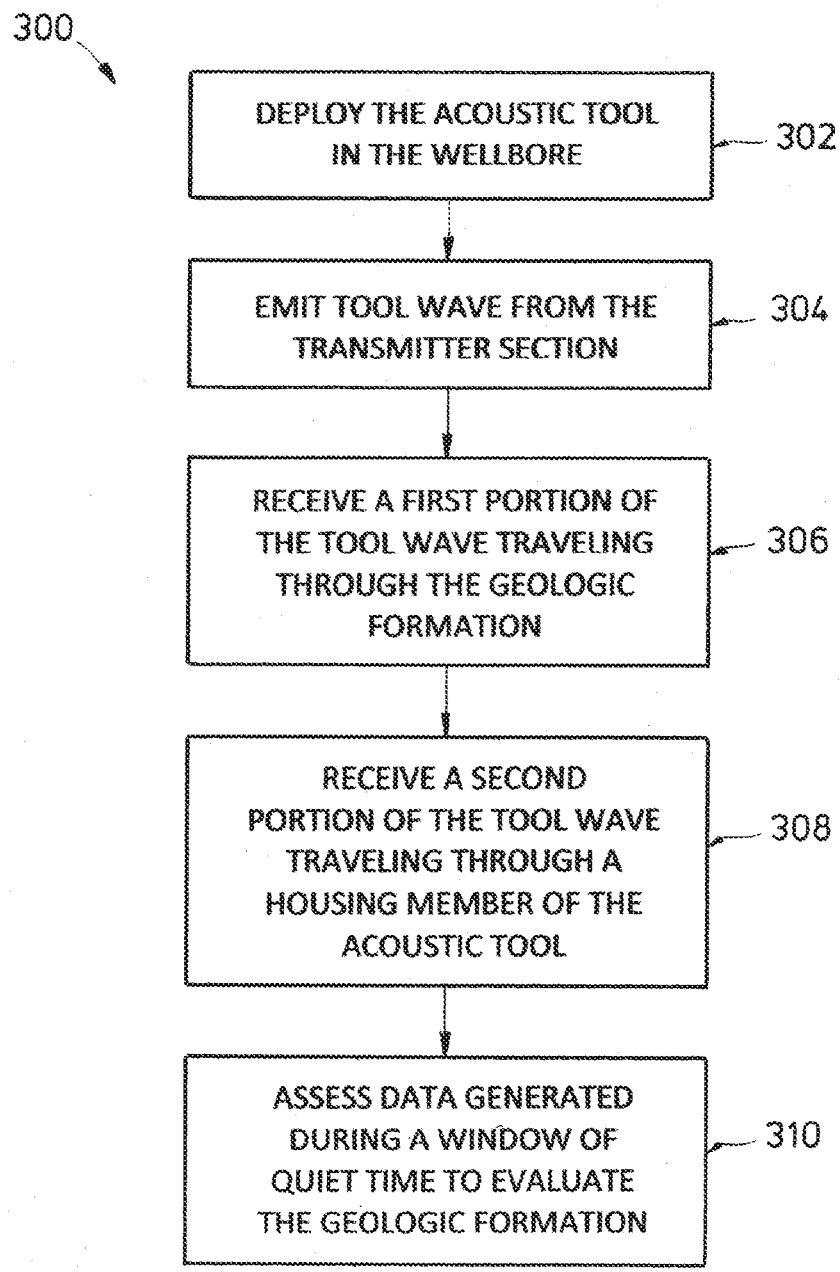
FIG. 24 is a flowchart illustrating an operational procedure for evaluating a geologic formation in accordance with example embodiments of the present disclosure.

Referring to FIG. 24, and with reference to FIGS. 1 and 2, one example operational procedure 300 evaluating the geologic formation "G" is described. Initially at step 302, acoustic tool 32 or 48 is deployed into the wellbore 10. The wireline acoustic tool 32 may be lowered into the wellbore 10 on the wireline 24 with surface electronics 26, and the logging while drilling acoustic tool 48 may be lowered into the wellbore 10 on the tool string 44 as appreciated by those skilled in the art.

Next, at step 304, an acoustic signal or tool wave may be emitted from the transmitter section 36, 52. A first portion of the tool wave may travel through the geologic formation "G" and a second portion of the tool wave may travel through the tortuous acoustic path defined by housing member 40, 50. In some embodiments, the transmitter section 36, 52 can emit a tool wave having a wavelength with a predetermined relationship to the housing member 40, 50, or an individual lateral layer defined therein. For example, the tool wave may be an acoustic wave having a wavelength of about half the length of an individual layer, such that the layer can exhibit maximum destructive additive properties with a portion of the wave's energy that is reflected at a reversal of direction defined between lateral layers.

In some exemplary embodiments, the first portion of the tool wave traveling through the geologic formation "G" arrives at the receiver section 38, 54 before the second portion of the tool wave traveling through the housing member 40, 50. At step 306, the receiver section 38, 54 begins to receive, record, and/or evaluate the first portion of the tool wave. The first portion of the tool wave is received for a window of quiet time that is free of interference from the second portion of the tool wave. In some embodiments, data representative of the first portion of the tool wave is stored in the LWD memory module "M" while the acoustic tool is deployed in the wellbore. The data stored may be evaluated at a later time, e.g., when the acoustic tool 48 is removed from the wellbore 10. Also in some embodiments, at least a portion of the data collected by the LWD memory module "M" may be transmitted to a surface location "S," e.g., with the communication device "C" for evaluation prior to removing the acoustic tool 48 from the wellbore 10.

Next at step 308, the receiver section 38, 54 begins to receive the second portion of the tool wave traveling through the housing member 40, 50. The receiver section 38, 54 may continue to receive the first portion of the tool wave. At step 310, data generated by receiving the first portion of the tool wave during the window of quiet time is assessed to evaluate the geologic formation "G".

3. Aspects Of The Disclosure

The aspects of the disclosure described in this section are provided to describe a selection of concepts in a simplified form that are described in greater detail above. This section is not intended to identify key features or essential features of the claimed subject matter, nor is it intended to be used as an aid in determining the scope of the claimed subject matter.

In one aspect, the disclosure is directed to an acoustic tool for use in evaluating a geologic formation. The acoustic tool includes a transmitter section, a receiver section longitudinally separated from the transmitter section and a housing member coupled between the transmitter section and the receiver section. The transmitter section includes at least one acoustic transmitter therein and the receiver section includes at least one receiver therein. The housing member defines an acoustic path between the transmitter section and the receiver section and includes a plurality of layers. Each layer of the plurality of layers includes one lateral end separated from an adjacent layer and another lateral end coupled to the adjacent layer at a lateral end of the adjacent layer such that an alteration in direction is defined in the acoustic path between the adjacent layers.

In one or more exemplary embodiments, the housing member includes at least three lateral layers each coupled to one another at longitudinal ends thereof such that an alteration of direction is defined in the acoustic path where each lateral layer is coupled to an adjacent lateral layer. In some embodiments, the alterations of direction defined in the acoustic path between each lateral layer include a reversal of direction in the acoustic path. The housing member may be constructed of a plurality of housing modules coupled to one another at longitudinal ends thereof such that the acoustic path extends through each housing module of the plurality of housing modules, and wherein a first housing module of the plurality of housing module includes a different number of lateral layers than a second housing module of the plurality of housing modules. In some embodiments, a first layer of the at least three lateral layers is thicker than a second layer of the at least three lateral layers. In some embodiments, the housing member may include an asymmetric construction wherein a one or more of the lateral layers has a thickness on one lateral side of the housing member that is different than a thickness of the one or more lateral layers on another lateral side of the housing member. In one or more embodiments, each of the at least three lateral layers generally circumscribes a longitudinal axis defined by the housing member. A first layer of the at least three lateral layers may define a first layer axis, and second layer of the at least three lateral layers defines a second layer axis that is offset from the first layer axis. In some exemplary embodiments, at least one layer of the at least three lateral layers defines a curve or bend therein between the longitudinal ends thereof. In some embodiments, the housing member includes at least one radially oriented layer therein.

In some exemplary embodiments the housing member further includes a plurality of discontinuities defined therein in a preselected continuous pattern. The housing member may be constructed of a plurality of housing modules coupled to one another at longitudinal ends thereof, and each housing module may define at least one alteration of direction in the acoustic path between adjacent lateral layers thereof. In one or more embodiments, each housing module of the plurality of housing modules is joined to an adjacent housing module of the plurality of housing modules by at least one of the group consisting of a threaded connection defined therebetween, bolts, fasteners, and/or a welded joint.

In some embodiments, the first one of the plurality of housing modules is dissimilar from a second one of the plurality of housing modules in at least one of the following: a longitudinal length; a material of construction; a shape or curvature of the layers; a thickness of the layers; and/or a number of layers.

In one or more embodiments, the acoustic tool further includes a damping material is disposed adjacent to the housing member. The damping material may exhibit relatively greater acoustic damping characteristics than the housing member. The damping material may include at least one of a rubber, a polymer, and/or an epoxy, and the damping material may be disposed within at least one of an interior and an exterior lateral space defined between adjacent lateral layers.

In one or more exemplary embodiments, the acoustic tool further includes at least one modulating mass mounted to the housing member and acoustically coupled to the transmitter section to modulate natural frequencies of the housing member. In some embodiments, the at least one modulating mass is coupled to a region of the housing member defining a thicker wall than adjacent regions of the housing member.

In some embodiments, the acoustic tool further comprises a wireline coupled to an upper end of the transmitter section. In some embodiments, the acoustic tool further includes a drill bit coupled to a lower end of the receiver section. In some embodiments, the at least one receiver is operably coupled to an LWD memory module carried by the acoustic tool and operable to collect data from the at least one receiver.

According to another aspect, the disclosure is directed to a housing apparatus for supporting a receiver section of an acoustic tool a longitudinal distance from a transmitter section of the acoustic tool. The housing apparatus includes a first lateral layer having a first longitudinal end and a second longitudinal end, the first longitudinal end of the first lateral layer for coupling to the transmitter section and the second longitudinal end of the first lateral layer disposed a first longitudinal distance from the first longitudinal end of the first lateral layer. The housing apparatus also includes a second lateral layer laterally offset from the first lateral layer and having a first longitudinal end and a second longitudinal end, the first longitudinal end of the second lateral layer coupled to the second longitudinal end of the first lateral layer such that the second longitudinal end of the second lateral layer is disposed a second longitudinal distance from the first longitudinal end of the first lateral layer, wherein the second longitudinal distance is less than the first longitudinal distance.

In one or more exemplary embodiments, the housing apparatus further includes a third lateral layer laterally offset from the first and second lateral layers and having a first longitudinal end and a second longitudinal end, the first longitudinal end of the third lateral layer coupled to the second longitudinal end of the second lateral layer and the second longitudinal end of the third lateral layer disposed a third longitudinal distance from the first longitudinal end of the first lateral layer, wherein the third longitudinal distance is greater than the second longitudinal distance. In some exemplary embodiments, the first, second and third lateral layers are constructed of a single piece of material.

In some exemplary embodiments, the housing apparatus includes at least one housing module coupled to the second longitudinal end of the third lateral layer, and wherein the at least one housing module is operable to be coupled to the receiver section of the acoustic tool. In some embodiments, the housing apparatus further includes a pocket formed therein for supporting a receiver of the acoustic tool.

According to another aspect, the disclosure is directed to a wellbore tool system. The wellbore tool system includes a wireline, drillstring or other conveyance extending from a surface location into a wellbore and an acoustic tool coupled to a lower end of the wireline, drillstring or other conveyance. The acoustic tool includes a transmitter section including at least one acoustic transmitter therein and a receiver section including at least one receiver therein and longitudinally separated from the transmitter section. A housing member is coupled between the transmitter section and the receiver section and defines an acoustic path therebetween. The housing member includes a first lateral layer having a first end and a second end, the first end of the first lateral layer coupled to the transmitter section and the second end of the first lateral layer disposed a first longitudinal distance from the transmitter section. The housing member also includes a second lateral layer laterally offset from the first lateral and having a first end and a second end, the first end of the second lateral layer coupled to the second end of the first lateral layer and the second end of the second lateral layer disposed a second longitudinal distance from the transmitter section. The second longitudinal distance is less than the first longitudinal distance. A third lateral layer is laterally offset from the first and second lateral layers and has a first end and a second end. The first end of the third lateral layer coupled to the second end of the second lateral layer and the second end of the third lateral layer disposed a third longitudinal distance from the transmitter section, wherein the third longitudinal distance is greater than the second longitudinal distance. The second end of the second lateral layer and the first end of the third lateral layer are substantially disconnected from the transmitter section except through the first lateral layer.

The Abstract of the disclosure is solely for providing the United States Patent and Trademark Office and the public at large with a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed is:

1. An acoustic tool for evaluating a geologic formation, the acoustic tool comprising:
    a transmitter section including at least one acoustic transmitter therein;
    a receiver section including at least one receiver therein and longitudinally separated from the transmitter section; and
    a housing member coupled between the transmitter section and the receiver section and defining an acoustic path therebetween, the housing member comprising a plurality of layers constructed of a single piece of material and, wherein each layer of the plurality of layers includes a first longitudinal end separated from an adjacent layer and a second longitudinal end coupled to the adjacent layer at a first longitudinal end of the adjacent layer by a curve defined in the single piece of material such that an alteration in direction is defined in the acoustic path between adjacent layers.

2. The acoustic tool of claim 1, wherein the housing member comprises at least three lateral layers each coupled to one another at longitudinal ends thereof such that an alteration of direction is defined in the acoustic path where each lateral layer is coupled to an adjacent lateral layer.

3. The acoustic tool of claim 2, wherein the alterations of direction defined in the acoustic path between each lateral layer comprises a reversal of direction in the acoustic path.

4. The acoustic tool of claim 3, wherein the housing member is constructed of a plurality of housing modules coupled to one another at longitudinal ends thereof such that the acoustic path extends through each housing module of the plurality of housing modules, and wherein a first housing module of the plurality of housing module includes a different number of lateral layers than a second housing module of the plurality of housing modules.

5. The acoustic tool of claim 4, wherein a first one of the plurality of housing modules is dissimilar from a second one of the plurality of housing modules in at least one of the following:
    a longitudinal length;
    a material of construction;
    a shape or curvature of the layers;
    a thickness of the layers; and
    a number of layers.

6. The acoustic tool of claim 3, wherein a first layer of the at least three lateral layers is thicker than a second layer of the at least three lateral layers.

7. The acoustic tool of claim 3, wherein each of the at least three lateral layers generally circumscribes a longitudinal axis defined by the housing member, and wherein a first layer of the at least three lateral layers defines a first layer axis, and wherein a second layer of the at least three lateral layers defines a second layer axis that is offset from the first layer axis.

8. The acoustic tool of claim 1, wherein the housing member further comprises a plurality of discontinuities defined therein in a preselected continuous pattern.

9. The acoustic tool of claim 1, further comprising a drill bit coupled to a lower end of the receiver section.

10. The acoustic tool of claim 9, wherein the at least one receiver is operably coupled to a logging-while-drilling memory module carried by the acoustic tool and operable to collect data from the at least one receiver.

11. The acoustic tool of claim 1, further comprising a damping material disposed adjacent the housing member; the damping material exhibiting a relatively greater acoustic damping characteristics than the housing member.

12. The acoustic tool of claim 11, wherein the damping material includes at least one of a rubber, a polymer, and an epoxy, and wherein the damping material is disposed within at least one of an interior and an exterior lateral space defined between adjacent lateral layers.

13. The acoustic tool of claim 1, further comprising at least one modulating mass mounted to the housing member and acoustically coupled to the transmitter section to modulate natural frequencies of the housing member.

14. The acoustic tool of claim 1, wherein the housing member comprises at least one radially oriented layer therein.

15. A housing apparatus for supporting a receiver section of an acoustic tool a longitudinal distance from a transmitter section of the acoustic tool, the housing apparatus comprising:
    a first lateral layer constructed of a piece of material, the first lateral layer having a first longitudinal end and a second longitudinal end, the first longitudinal end of the first lateral layer for coupling to the transmitter section and the second longitudinal end of the first lateral layer disposed a first longitudinal distance from the first longitudinal end of the first lateral layer; and a second lateral layer constructed of the same piece of material as the first lateral layer, the second lateral layer laterally offset from the first lateral layer and having a first longitudinal end and a second longitudinal end, the first longitudinal end of the second lateral layer coupled to the second longitudinal end of the first lateral layer by a first curve defined in the piece of material such that the second longitudinal end of the second lateral layer is disposed a second longitudinal distance from the first longitudinal end of the first lateral layer, wherein the second longitudinal distance is less than the first longitudinal distance.

16. The housing apparatus of claim 15, further comprising a third lateral layer constructed of the same piece of material as the first and second lateral layers, the third lateral layer laterally offset from the first and second lateral layers and having a first longitudinal end and a second longitudinal end, the first longitudinal end of the third lateral layer coupled to the second longitudinal end of the second lateral layer by a second curve defined in the piece of material and the second longitudinal end of the third lateral layer disposed a third longitudinal distance from the first longitudinal end of the first lateral layer, wherein the third longitudinal distance is greater than the second longitudinal distance.

17. The housing apparatus of claim 16, further comprising at least one housing module coupled to the second longitudinal end of the third lateral layer, and wherein the at least one housing module is operable to be coupled to the receiver section of the acoustic tool.

18. The housing apparatus of claim 15, further comprising a pocket therein for supporting a receiver of the acoustic tool.

19. A wellbore tool system comprising:
a conveyance extending from a surface location into a wellbore; and
an acoustic tool coupled to a lower end of the conveyance, the acoustic tool comprising:
a transmitter section including at least one acoustic transmitter therein;
a receiver section including at least one receiver therein and longitudinally separated from the transmitter section; and
a housing member coupled between the transmitter section and the receiver section and defining an acoustic path therebetween, the housing member comprising:
a first lateral layer constructed of a piece of material, the first lateral layer having a first end and a second end, the first end of the first lateral layer coupled to the transmitter section and the second end of the first lateral layer disposed a first longitudinal distance from the transmitter section;
a second lateral layer constructed of the same piece of material as the first lateral layer, the second lateral layer laterally offset from the first lateral layer and having a first end and a second end, the first end of the second lateral layer coupled to the second end of the first lateral layer by a first curve defined in the piece of material and the second end of the second lateral layer disposed a second longitudinal distance from the transmitter section, wherein the second longitudinal distance is less than the first longitudinal distance; and
a third lateral layer constructed of the same piece of material as the first and second lateral layers, the third lateral layer laterally offset from the first and second lateral layers and having a first end and a second end, the first end of the third lateral layer coupled to the second end of the second lateral layer by a second curve defined in the piece of material and second end of the third lateral layer disposed a third longitudinal distance from the transmitter section, wherein the third longitudinal distance is greater than the second longitudinal distance; and
wherein the second end of the second lateral layer and the first end of the third lateral layer are substantially disconnected from the transmitter section except through the first lateral.

* * * * *